(12) United States Patent
Levola

(10) Patent No.: US 7,181,108 B2
(45) Date of Patent: Feb. 20, 2007

(54) METHOD AND OPTICAL SYSTEM FOR COUPLING LIGHT INTO A WAVEGUIDE

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 252 days.

(21) Appl. No.: 10/843,875

(22) Filed: May 11, 2004

(65) Prior Publication Data

US 2005/0002611 A1    Jan. 6, 2005

(30) Foreign Application Priority Data

May 13, 2003   (FI) ................................. 20030715

(51) Int. Cl.
*G02B 6/34* (2006.01)
(52) U.S. Cl. .......................................... 385/37; 385/11
(58) Field of Classification Search ...................... None
See application file for complete search history.

(56) References Cited

U.S. PATENT DOCUMENTS 5,745,266 A    4/1998  Smith
5,970,190 A *  10/1999 Fu et al. ....................... 385/37
6,285,813 B1   9/2001  Schultz et al.
2002/0122015 A1  9/2002  Song et al.

FOREIGN PATENT DOCUMENTS

EP          0 535 402      4/1993
WO          WO 99/52002   10/1999

* cited by examiner

*Primary Examiner*—Frank G. Font
*Assistant Examiner*—James P. Hughes
(74) *Attorney, Agent, or Firm*—Alfred A. Fressola; Ware, Fressola, Van Der Sluys & Adolphson LLP

(57) ABSTRACT

A method and optical system for coupling light from an incoming light wave (WI) into a waveguiding substrate (S) arranges the light wave (WI) to interact with a diffractive in-coupling grating element or elements (IG) arranged on or embedded within the substrate (S) and arranged to couple the energy from the light wave (WI) into a waveguided light wave (WG). The polarization state of the light wave (WI) is converted after its first interaction (D1) with the in-coupling grating element/elements (IG) and before a second interaction (D2) with the grating element/elements (IG) takes place. The method minimizes any "reverse" diffractions, which would direct light back towards the front-end optics and therefore to increase the width W of the in-coupling grating/gratings (IG). Preferred embodiments include diffractive beam expanders for virtual displays.

19 Claims, 7 Drawing Sheets

US 7,181,108 B2

METHOD AND OPTICAL SYSTEM FOR COUPLING LIGHT INTO A WAVEGUIDE

CROSS REFERENCE TO RELATED APPLICATIONS

This application claims priority under 35 USC §119 to Finnish Patent Application No. 20030715 filed on May 13, 2003.

FIELD OF THE INVENTION

The present invention relates to a method for coupling light into a planar waveguide. The invention also relates to an optical system for carrying out such a method.

BACKGROUND OF THE INVENTION

Generally speaking this invention relates to coupling of light into a planar waveguide, where preferably surface reliefs are used as in and out-coupling diffractive grating elements. Important applications include diffractive beam expanders for virtual displays, but the invention might also be applied to other optical imaging or illumination devices, where light needs to be coupled into a planar waveguide with high efficiency. Besides display systems, the invention may in its generic form be utilized in other type of optical systems as well, for example in optical couplers or other light modulator devices.

Display technology is one of the key elements in the development of new portable devices, which today typically feature wireless connectivity for voice and data access—and that will include a display for viewing, for example, text, graphics and different types of multimedia. The displays of such portable devices need to be increasingly capable of reproducing high quality still images and also live video. Such devices include, for example, advanced mobile phones and portable Internet appliances.

The display is the dominant (key) element in many portable products—both physically and from the cost perspective. This drives an increased interest towards virtual displays, especially those using microdisplays as the image source. Virtual displays offer increased displayed image size and resolution, yet physically shrink the size of the image source, i.e. the imager itself. In many cases, the smaller the imager, the lower the cost of the system. So, not only do these displays promise to lower system costs, but their physically smaller size will mean less bulky and heavy products and smaller power consumption, that is they will operate longer on the same battery source. Virtual displays based on microdisplays have high pixel densities and provide good image quality.

Virtual displays use imaging optics to magnify the "input" image from an imager in order to create a virtual "output" image for the observer. A virtual image is what one sees when looking in an electronic viewfinder of a digital video camera, for example. The virtual image appears to be larger and floating at some distance from the eye of the user—even though it is created by a small size integrated imager chip acting as the image source. In other words, the user or observer has the illusion of seeing the source image as if he/she stands at a certain distance from a larger display monitor.

Virtual displays, which are kept close to the eyes, can be monocular or biocular. Other type of virtual displays are, for example, Head Up Displays (HUDs), where the imaging optics are located somewhat further away from the eye.

The present invention may be applied to such virtual display systems, in which diffractive grating elements are used as a part of the imaging optics together with a planar waveguide in order to create an enlarged virtual image from a smaller size real image created by an imager, typically by an integrated circuit display chip. Such virtual display devices are already known in the art. For example, patent publication WO 99/52002 discloses optical devices, in which a plurality of holographic optical elements (HOEs), i.e. diffractive grating elements are arranged on a common planar light-transmissive substrate. Such devices may be used for magnifying the exit pupil of the imaging optics creating a virtual image at infinity and further reflecting this virtual image into the eye of an observer. The enlargement of the exit pupil of a virtual display system with a beam-expanding optical configuration, such as with those described in the document WO 99/52002, results in larger eye relief, which makes the virtual display device more convenient to use. A significantly larger eye relief allows to move the display device further away from the immediate vicinity of the observer's eyes. This makes it possible to observe the virtual display in a manner resembling the use of an ordinary display panel reproducing real images. In certain context such displays may be referred to as window displays.

However, prior art solutions where an in-coupling diffractive grating element is used to couple light into a waveguiding substrate suffer from certain significant limitations. In virtual display applications these limitations degrade the quality of the reproduced virtual images, for example, by reducing the contrast and/or brightness of the produced images.

FIG. 1 describes in a simplified cross-sectional view of one possible configuration of a monocular type diffractive beam expander comprising an in-coupling grating IG and an out-coupling grating OG arranged on a transparent and planar substrate S. In this example the in-coupling grating IG is of reflective type, but it is also possible that it could be of transmissive type, i.e. arranged as schematically shown in FIG. 2 on the lower interface IFL of the substrate S, where the in-coming light wave WI first interacts with the waveguiding substrate S.

When used as a part of a virtual display system, the in-coupling grating IG couples the in-coming light wave WI from an imager via suitable front end optics into the substrate S, where the light is diffracted by said grating in FIG. 1 towards right to become a waveguided light wave WG that propagates along the substrate S. For a person skilled in the art it is clear that light might have been diffracted in a similar manner also to the left in order to have a biocular beam expander. After the aforementioned in-coupling, the light travels inside the substrate S based on total internal reflections (TIR) until the out-coupling grating OG couples the light out from the substrate S towards the observer.

It can be shown, that if the width W of the in-coupling grating IG is arranged to be smaller than $2h \tan \theta$, where h is the thickness of the substrate S and $\theta$ is the diffraction angle of the light with respect to the normal of the plane of the in-coupling grating IG, then the in-coming light wave WI interacts with said grating IG only once and after that travels forward inside the substrate plate based on TIR until it meets the out-coupling grating OG. In other words, when the width W of the in-coupling grating IG is kept small enough, then the in-coming light wave experiences first diffraction D1 from the in-coupling grating IG, but after the consequent first TIR1 from the lower interface IFL of the substrate S, the next interaction with the upper surface IFU of the substrate S takes place outside the in-coupling grating IG.

A second interaction of the light wave with the in-coupling grating IG is undesirable, because this causes a significant part of the light to reverse its direction and become diffracted back substantially towards the imager and/or the front end optics. Therefore, a part of the light energy is lost and especially in the case of an imaging system, the contrast is decreased and the overall efficiency is significantly reduced.

However, in order to be able to use a smaller f-number in the front end optics and therefore to have higher light gathering power in said optics, it would be highly desirable to have a way around the above described limitations related to the width W of the in-coupling grating IG.

SUMMARY OF THE INVENTION

The main purpose of the current invention is to present a novel solution for getting around the aforementioned limitations related to the width W of the in-coupling grating IG. The invention makes it possible to increase the width W of the in-coupling grating IG without the simultaneous effect that causes significant amount of light to escape through unwanted reflections.

The invention is especially suitable to be used for various beam expansion purposes in virtual display devices. The invention may be applied for both monocular or biocular devices, in which the in-coupling diffractive grating element is either of transmissive or reflective type.

To attain these purposes, the method according to the invention is a method for coupling light from an incoming light wave into a light-transmittive, preferably planar waveguiding substrate, said method comprising the step of arranging the incoming light wave to interact with a diffractive in-coupling grating element or elements arranged on or embedded within said substrate and arranged to couple the energy from said incoming light wave into a waveguided light wave propagating within said substrate, wherein the method comprises further at least the step of converting the polarization state of the light wave after its first interaction with said in-coupling grating element or elements and before a second interaction with said in-coupling grating element or elements takes place. The optical system according to the invention is an optical system for coupling light from an incoming light wave into a light-transmittive, preferably planar waveguiding substrate, said system comprising a diffractive in-coupling grating element or elements arranged on or embedded within said substrate and arranged to interact with said incoming light wave in order to couple the energy from said incoming light wave into a waveguided light wave propagating within said substrate, wherein the optical system comprises further at least polarization conversion means to convert the polarization state of the light wave after its first interaction with said in-coupling grating element or elements and before a second interaction with said in-coupling grating element or elements takes place. The dependent claims describe further some preferred embodiments of the invention.

The basic idea of the invention is to change the polarization of the light wave after its first diffraction D1 from the in-coupling grating IG before a second diffraction from said grating is allowed to take place. Between these first and second interactions with the in-coupling grating IG the beam experiences its first TIR1 at the opposite interface of the substrate S. According to one embodiment of the invention a polarization retarding layer is arranged in the vicinity of said interface causing the beam to alter its polarization upon undergoing its first TIR1.

When the polarization of the light wave is changed between the first and second interactions with the in-coupling grating IG, this makes it possible to design the in-coupling grating IG so that it will not produce any significant "reverse" diffractions, which would direct light back towards the front-end optics. Without the polarization being altered according to the invention in a proper way, such grating design can not be realized in practise.

The invention makes it thus possible to increase the width W of the in-coupling grating IG so that the light wave is allowed to interact twice with said grating before it proceeds along the waveguiding substrate S based on TIR.

Depending on the type (reflective, transmissive) of the in-coupling grating IG the means required to change the polarisation of the light wave between the first and second interactions with said grating can be various. The change in the polarization can be effected using one or more polarization retarding layers inside the substrate S or at its interfaces IFL, IFU.

In order to optimize the efficiency of the grating device according to the invention the profile and depth of the in-coupling grating IG should be suitably selected. Optionally, optical coatings may be used on the in-coupling grating IG or on the interfaces IFL, IFU of the substrate S, or on any related optical means.

The period of the in-coupling grating IG is typically in the order of the wavelength of light, so that only the first diffraction orders are possible in the first interaction D1 with the grating.

The polarization rotation after the first interaction improves the overall performance when using almost any shape of the grating but, preferably, the in-coupling grating is realized as a surface relief structure having a binary or nearly binary profile. Further, the aspect ratio of the binary type grating profile, i.e. the filling ratio (material/no material) may also be optimised.

The preferred embodiments of the invention and their benefits will become more apparent to a person skilled in the art through the description and selected examples given herein below, and also through the appended claims.

BRIEF DESCRIPTION OF THE DRAWINGS

In the following, the invention will be described in more detail with reference to the appended drawings, in which.

DETAILED DESCRIPTION OF THE INVENTION

Figure 1:
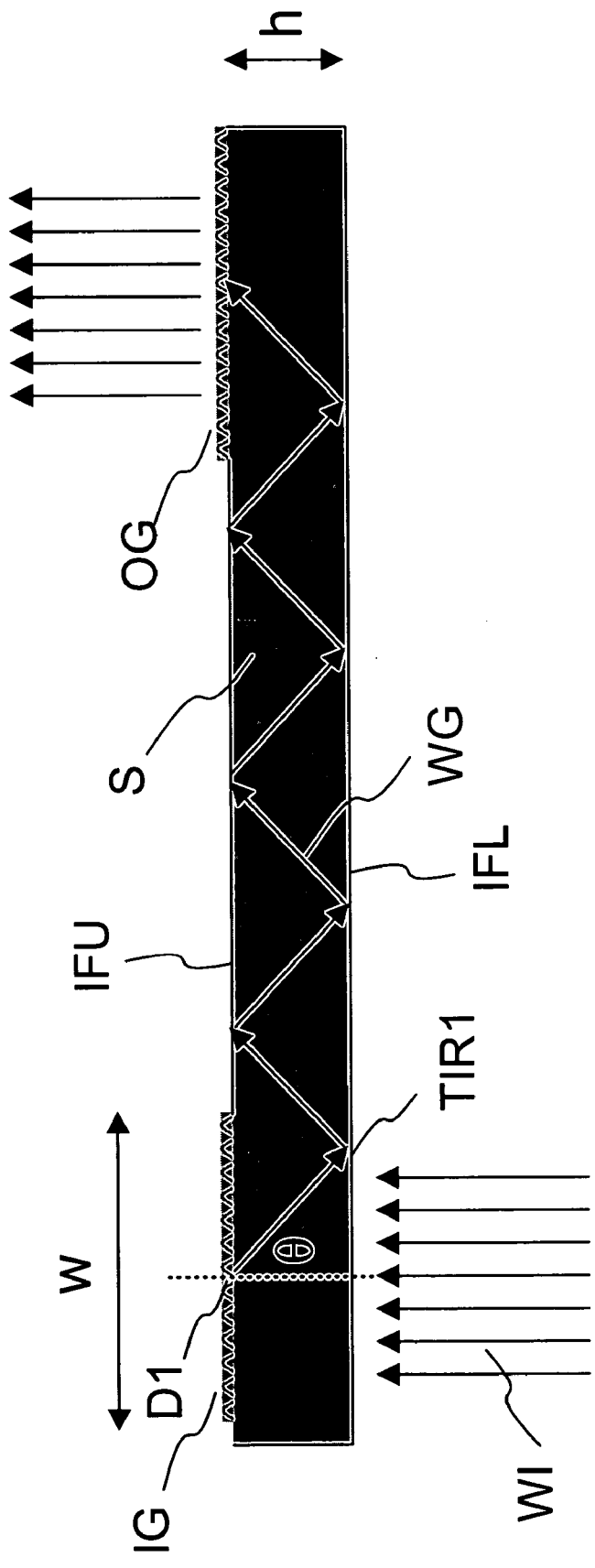
FIG. 1 illustrates schematically in a cross-sectional view a prior art diffractive beam expander, where in-coupling grating operates in reflective mode.

It is to be understood that the drawings presented herein are designed solely for purposes of illustration and thus, for example, not for showing the various components of the devices in their correct relative scale and/or shape. For the sake of clarity, the components and details which are not essential in order to explain the spirit of the invention have been omitted in the drawings.

Figure 2:
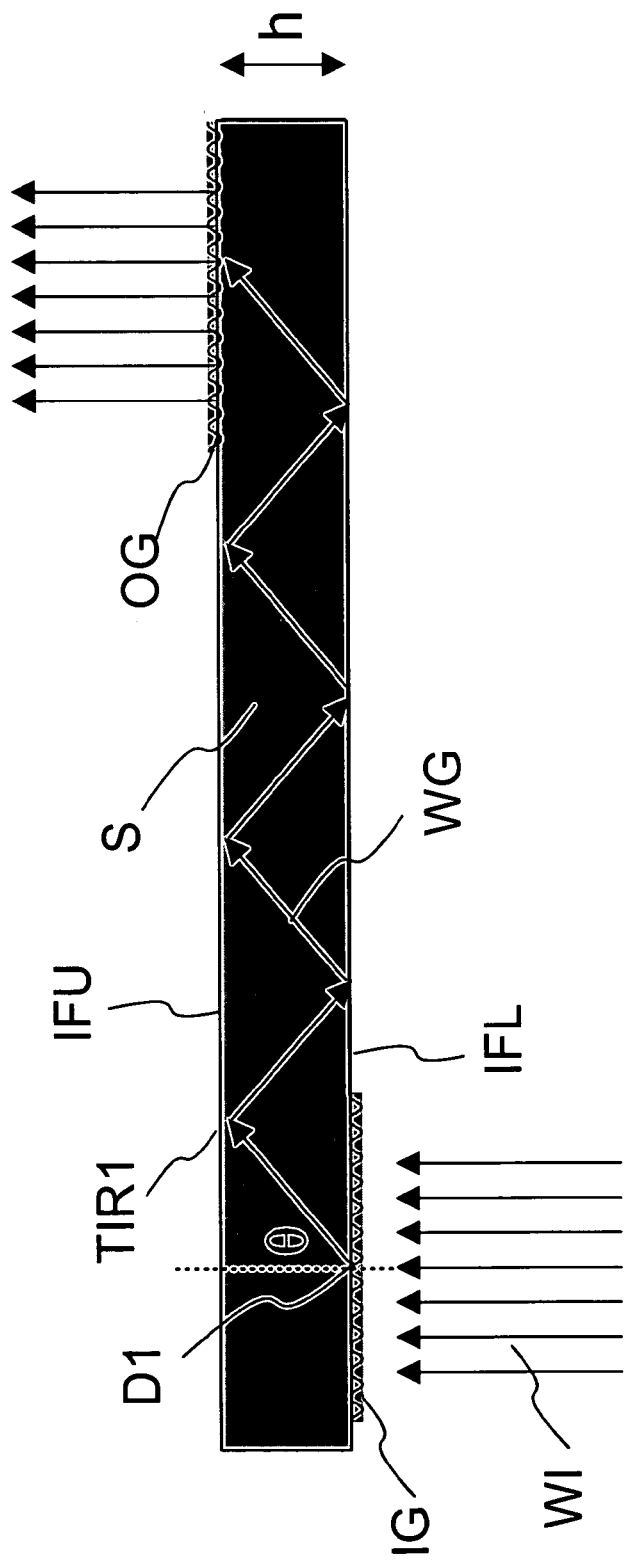
FIG. 2 illustrates schematically in a cross-sectional view a prior art diffractive beam expander, where in-coupling grating operates in transmissive mode.

FIGS. 1 and 2, which present solutions known already from the related art, have already been discussed above.

Figure 3:
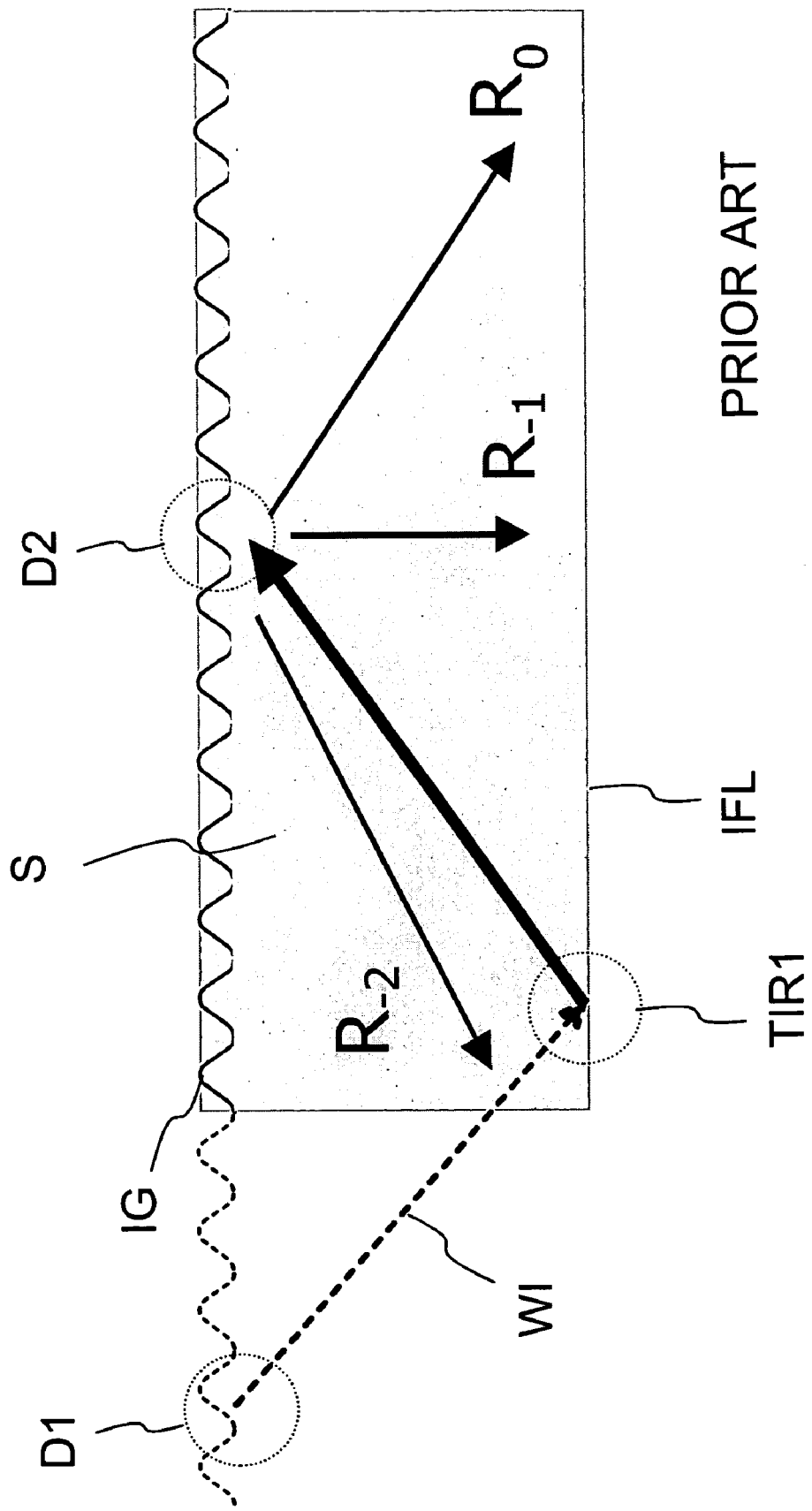
FIG. 3 illustrates schematically the second interaction of light wave with the in-coupling grating after first TIR in a prior art situation.

FIG. 3 illustrates schematically the second interaction/diffraction D2 of the light wave WI upon the in-coupling grating IG in a prior art type situation after the light wave has already experienced the first interaction/diffraction D1 and subsequent first TIR1.

In order to fulfil conditions for TIR and to keep the reflection angles modest, the refractive index of the substrate material S should be as high as possible. In this study a high refractive index plastic (n=1.71) has been used. Here also the in-coupling grating IG period is selected so close to the wavelength of the incoming light wave WI, that only the first diffraction orders are possible at the first interaction/diffraction D1 with said grating. For the light wave already "trapped" inside the waveguiding substrate S plate after first interaction D1 and subsequent first TIR1, also second order diffraction modes exist in the second interaction D2, as shown in FIG. 3.

Referring to FIG. 3, the problem in prior art solutions have been that irrespective of the various designs for the in-coupling grating IG, in all cases after the first TIR1, the incoming light wave WI upon second interaction D2 is diffracted efficiently back towards front-end optics (mode $R_{-1}$) and not only into a "useful" propagating mode or modes.

Figure 4:
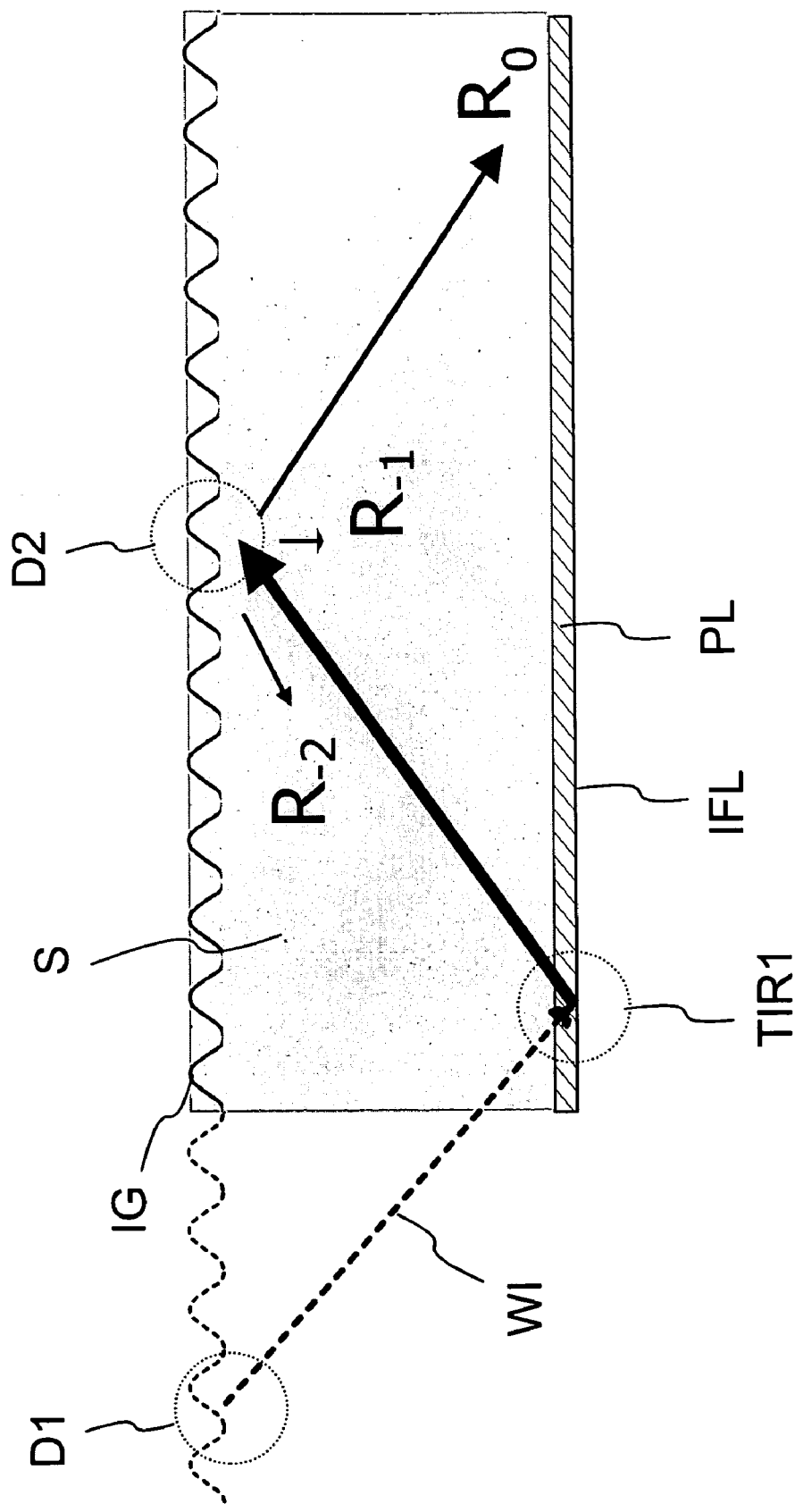
FIG. 4 illustrates schematically the second interaction of light wave with the in-coupling grating after first TIR in a situation according to the invention.

The current invention arises from the observation that in this respect different polarizations of the light wave, however, behave quite differently. For example, if there is no significant depolarization taking place in the substrate S, it is beneficial to change the polarization of the light wave WI from TE polarization to TM polarization after the first diffraction D1 from the in-coupling grating IG and before the second diffraction D2 takes place. Between these first and second interactions with the in-coupling grating IG the light wave experiences its first TIR1 at the interface IFL of the substrate S. According to one embodiment of the invention a polarization retarding layer PL can be arranged on said interface IFL as shown schematically in FIG. 4. In FIG. 4 the light wave is arranged to go through the polarization retarding layer PL "downwards" and "upwards" and in between to experience TIR from the lower surface of said layer. However, the polarization retarding layer PL does not necessarily need to be the surface giving rise to TIR, but said layer or volume may also be arranged within the substrate S so that the light wave actually passes twice through said layer/volume between the first D1 and second D2 interactions with the in-coupling grating IG.

When the polarization of the light wave is changed between the first D1 and second D2 interactions with the in-coupling grating IG, this makes it now possible to design the in-coupling grating IG so that it will not produce any significant "reverse" diffractions, which would direct light back towards the front-end optics. This effect is in FIG. 4 illustrated by showing the respective diffraction mode arrows smaller than in FIG. 3.

Figure 5:
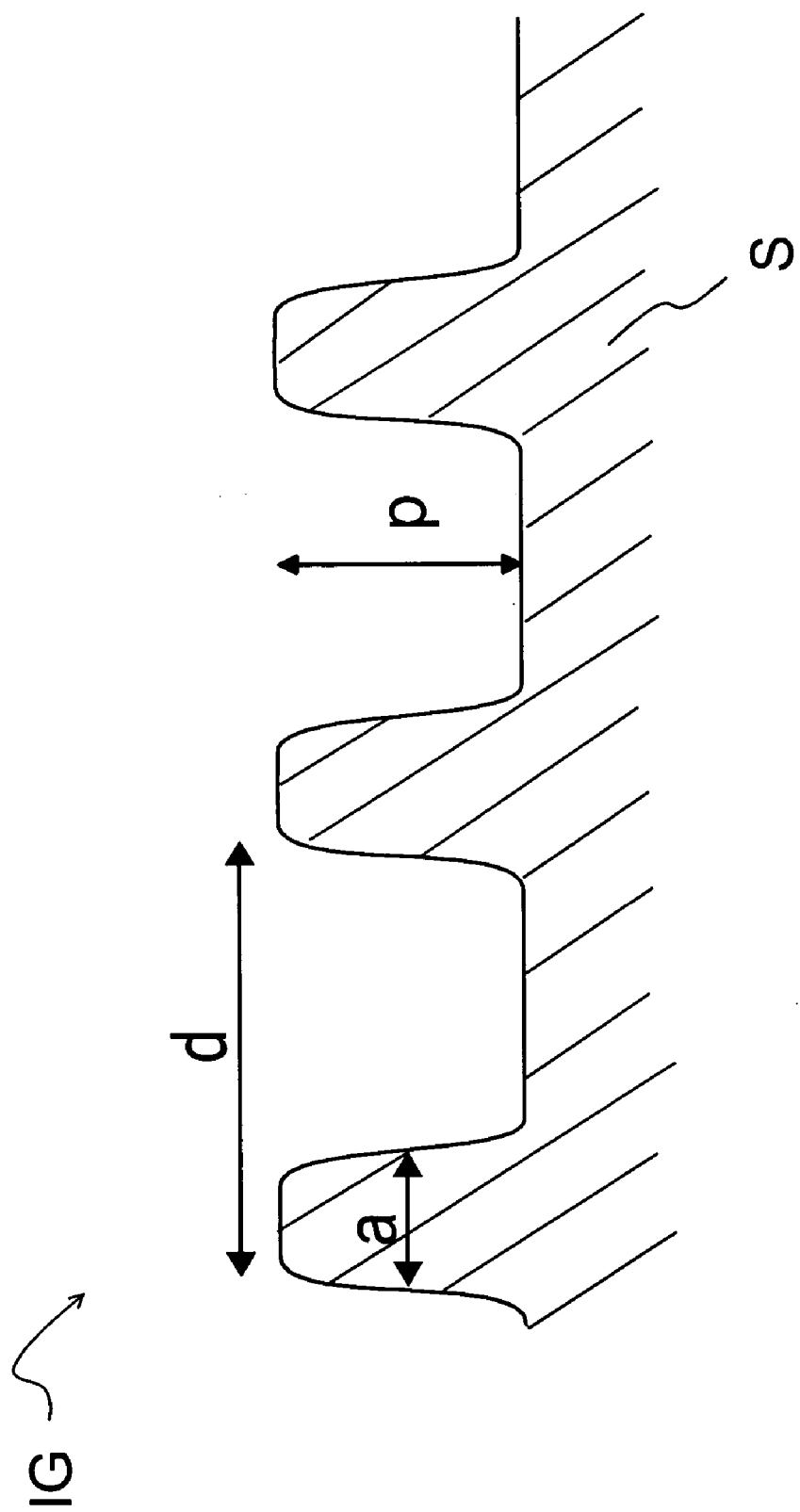
FIG. 5 illustrates schematically the preferred profile and aspect ratio of the in-coupling grating.

FIG. 5 illustrates schematically one preferred binary type profile for the in-coupling grating IG together with the definitions for aspect ratio a/d and grating depth p. In this invention it has been found, that smaller aspect ratios a/d of the in-coupling grating and binary type profile applied together with the above described conversion of polarization enable situation, where the forward travelling light wave $R_O$ can have maximum diffraction efficiency whereas the first order undesired diffractions $R_1$, $R_{-1}$ will at the same time be minimized. This applies to reflective type in-coupling gratings (FIG. 1) as well as to the transmissive ones (FIG. 2). In general, it seems that with binary type gratings aspect ratio a/d values smaller than 50% work well with the polarization conversion according to the invention. The shape of the "rounded shoulders" of a binary type grating depicted schematically in FIG. 5 might have form defined by function $x^n$, where n>4. However, the invention is not limited to these aspect ratio values or grating profiles.

If the reflective type in-coupling grating IG is coated with a good reflector, e.g. silver (Ag), the coupling becomes less wavelength dependent and the efficiency can be very high. The overall efficiency seems to be better the smaller the real part of the refractive index is. Very small (~0.05) real parts of the silver refractive index have been reported in literature, but in the calculations presented here a more conservative value (~0.25) has been used to be well on the safe side. The refractive index of a reflective coating depends on the thin film process used for preparing the coating.

Figure 6:
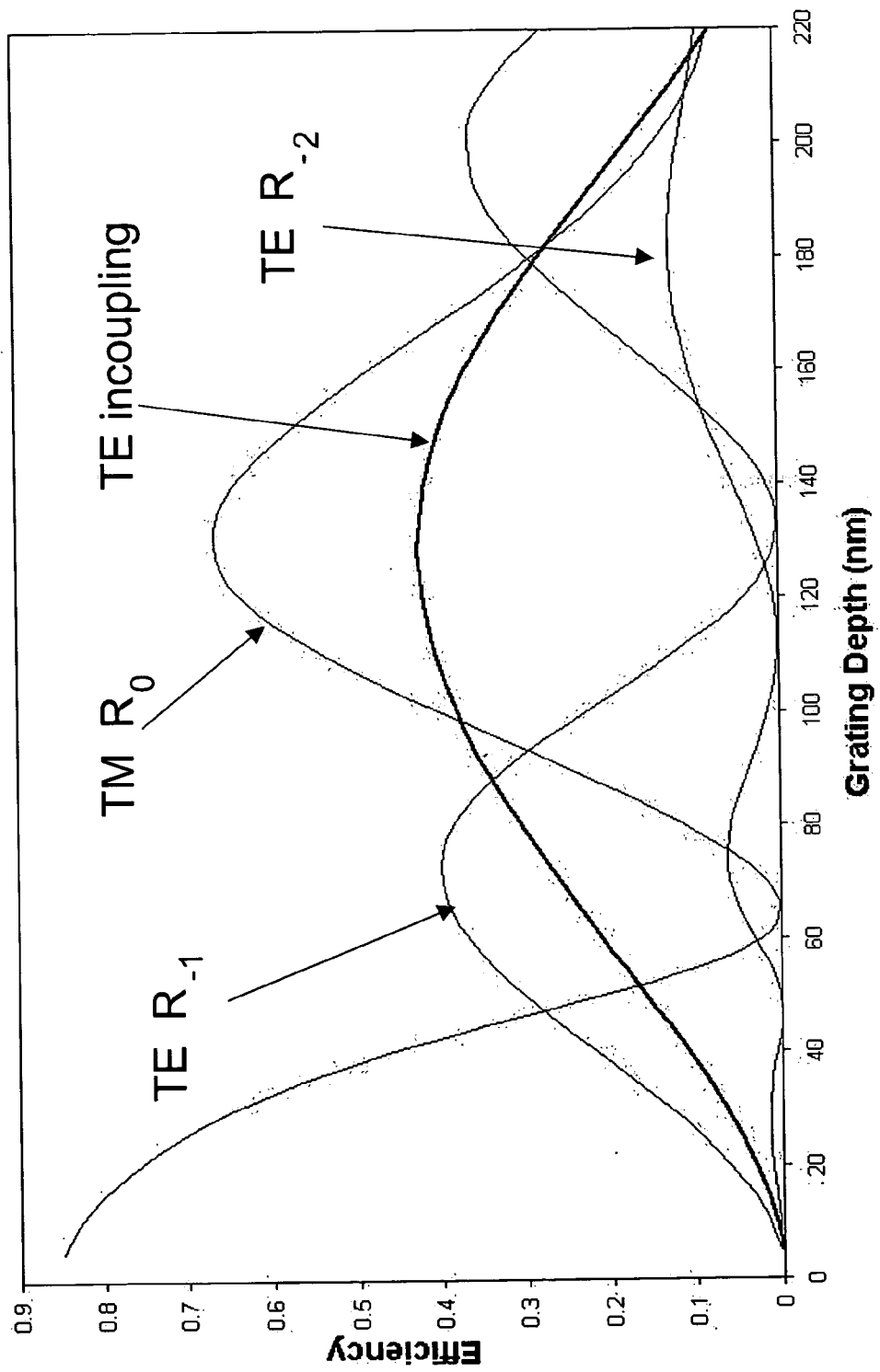
FIG. 6 shows comparison of diffraction efficiencies for different diffraction orders and different polarizations as a function of in-coupling grating profile depth.

FIG. 6 shows calculated diffraction efficiencies as a function of the grating depth p of a near binary (shape as depicted in FIG. 5) grating having 38% aspect ratio a/d. From FIG. 6 it becomes evident that with these parameters the optimum grating depth p is around 130 nm for an Ag coated reflective in-coupling grating IG. With the aforementioned value the $R_O$ mode is maximized whereas the modes $R_{-1}$ and $R_{-2}$ have very small diffraction efficiencies.

For a transmissive type grating having similar grating profile and aspect ratio the optimum grating depth is around 200 nm. The improvement in efficiencies in a transmissive type in-coupling grating IG by rotating the polarization are similar to the coated reflective one, but not so pronounced.

Figure 7:
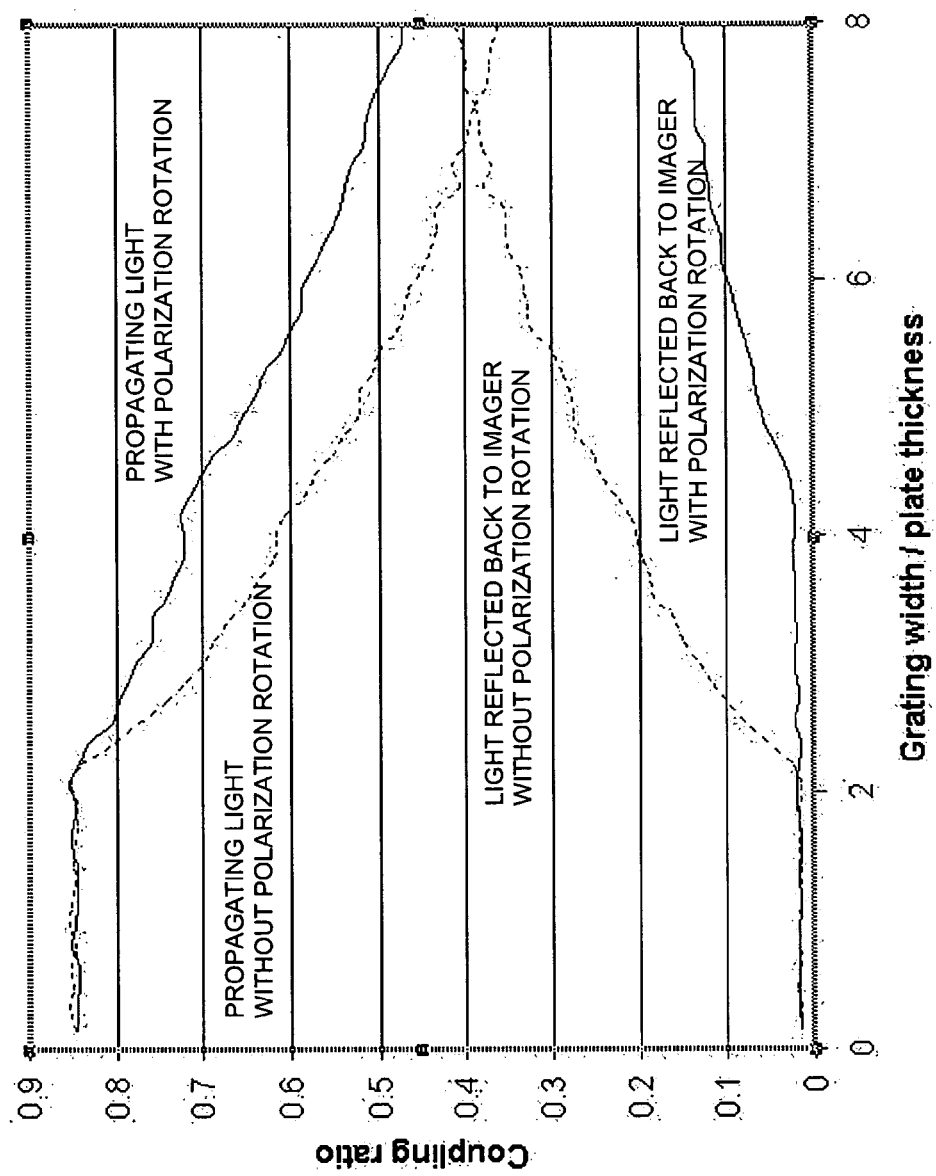
FIG. 7 shows performance of systems with and without polarization respect to useful and undesired diffractions.

The calculations prove that with the polarization conversion the in-coupling grating IG can be made about two times wider than without said conversion. This can be seen from FIG. 7, where the performance of optical systems with and without polarization respect to useful, propagating ($R_0$) and undesired, back reflected ($R_{-1}$, $R_{-2}$) diffractions is compared. In FIG. 7 the horizontal scale is give as the ratio of the grating width W against substrate, i.e. plate thickness h.

The polarization conversion according to the invention increases significantly the amount of light propagating along the substrate S, but the benefits of the invention are even more evident when considering the amount of lost light reflected back towards the front-optics.

While the invention has been shown and described above with respect to selected embodiments of diffractive beam expander devices for virtual displays, it should be understood that these embodiments are only examples and that a person skilled in the art could construct other embodiments utilizing technical details other than those specifically disclosed herein while still remaining within the spirit and scope of the present invention. It should therefore be understood that various omissions and substitutions and changes in the form and detail of the optical systems illustrated, as well as in the operation of the same, may be made by those skilled in the art without departing from the spirit of the invention. It is the intention, therefore, to restrict the invention only in the manner indicated by the scope of the claims appended hereto.

The polarization conversion according to the invention may be accomplished by any suitable polarizing means apparent to a person skilled in the art. Therefore, it is not necessary that a retarder plate PL is located as shown in FIG. 4, but the location or the type of the polarizing means may vary freely as long as they provide the required change of the polarization state of the light wave between the first D1 and second D2 interaction with the in-coupling grating IG. Therefore, the polarizing means may be arranged on the interfaces IFL or IFU of the substrate S, or also within the substrate S material further away from the interfaces. The layer/volume providing the polarization conversion can thus be in principle arranged anywhere in the optical path between the in-coupling grating IG and the opposite interface (IFL in FIG. 1, IFU in FIG. 2) giving rise to the first TIR. Said layer/volume can be an optically anisotropic material or it can be a polarizing subwavelength scale grid, both known as such for polarization of light from related art. The polarizing layer/volume can also be arranged on top of the substrate S and the in-coupling grating IG may be formed directly on the material of said layer/volume to form a combined structure.

The invention can be used together with reflective or transmissive in-coupling gratings. Basically, in reflective systems the incoming light wave WI comes from air, goes through the first surface IFL of the substrate plate S, then propagates (nearly perpendicular) to the in-coupling grating IG arranged on the opposite surface IFU of the substrate plate S and becomes diffracted. In transmissive systems, the incoming light wave WI comes from air and meets immediately the in-coupling grating IG on the substrate plate S surface and is diffracted inside the substrate.

In order to optimize the efficiency of the in-coupling the properties of the in-coupling grating IG (for example profile, grating depth and aspect ratio) may be freely selected according to the invention. Any necessary coatings, reflective or anti-reflective may be used on any of the optical surfaces including the grating structures.

In addition to binary or substantially binary type grating profiles, also other grating profiles may be used. It can be shown that the invention works also with with sinusoidal and blazed gratings.

The waveguiding substrate S may be of any suitable transparent material, for example glass, but typically substrate S is plastic material with preferably high refraction index. However, also other plastic materials with lower refractive index may be used in certain applications, for example acrylic, polycarbonate, polystyrene etc.

For the polarization retarding layer PL, FIG. 4 showing one possible location and arrangement for it, for example plastic films may be used. However, any other polarization retarding material or arrangement may be used, including for example liquid crystals. Preferably, the incoming light wave WI is arranged to experience a change in its polarization state from TE to TM after leaving the in-coupling grating IG (diffraction D1) and before meeting it again (D2). Any configuration satisfying this condition is suitable.

What is claimed is:

1. A method comprising:
   arranging an incoming light wave to interact with a diffractive in-coupling grating element or elements arranged on or embedded within a planar waveguiding substrate and arranged to couple energy from said incoming light wave into a waveguided light wave propagating within said substrate, and
   converting the polarization state of the light wave after its first interaction with said in-coupling grating element or elements and before a second interaction with said in-coupling grating element or elements takes place.

2. A method according to the claim 1, wherein the polarization state of the light wave is converted from TE polarization to TM polarization.

3. An apparatus comprising:
   a diffractive in-coupling grating element or elements arranged on or embedded within a planar waveguiding substrate and arranged to interact with said incoming light wave in order to couple energy from said incoming light wave into a waveguided light wave propagating within said substrate, and
   a polarization converter to convert the polarization state of the light wave after its first interaction with said in-coupling grating element or elements and before a second interaction with said in-coupling grating element or elements takes place.

4. An optical system according to the claim 3, wherein the polarization converter is arranged to change the polarization state of the light wave from TE polarization to TM polarization.

5. An optical system according to the claim 3, wherein the polarization converter comprises at least one polarization retarding layer arranged on at least one interface of the waveguiding substrate.

6. An optical system according to the claim 5, wherein the polarization retarding layer/layers is/are arranged to give rise to the total internal reflections required for waveguiding the light wave within the substrate.

7. An optical system according to the claim 3, wherein the polarization converter is arranged within the substrate.

8. An optical system according to the claim 3, wherein the polarization converter is arranged to comprise the in-coupling grating element or elements in a combined structure.

9. An optical system according to the claim 3, wherein the period of the in-coupling grating/gratings is in the order of the wavelength of the incoming light wave to substantially allow only first diffraction orders in the first interaction with said grating/gratings.

10. An optical system according to the claim 3, wherein the in-coupling grating/gratings have substantially binary grating profile/profiles.

11. An optical system according to the claim 3, wherein the in-coupling grating/gratings have a aspect ratio value less than 50%.

12. An optical system according to the claim 3, wherein the in-coupling grating/gratings operate in reflective mode.

13. An optical system according to the claim 12, wherein the in-coupling grating/gratings comprise a reflection coating/coatings.

14. An optical system according to the claim 3, wherein the in-coupling grating/gratings operate in transmissive mode.

15. An optical system according to the claim 3, wherein the substrate material is a high refractive index plastic.

16. An optical system according to the claim 3, wherein said optical system comprises further a diffractive out-coupling grating element or elements to couple energy from the waveguided light wave out from the substrate and arranged to function as a diffractive beam expander.

17. An optical system according to the claim 16, wherein said diffractive beam expander is used in a virtual display device.

18. An apparatus comprising:

means embedded within a planar waveguiding substrate and arranged for interacting with an incoming light wave in order to couple energy from said incoming light wave into a waveguided light wave propagating within said substrate, and means for converting the polarization state of the light wave after its first interaction with said means for interacting and before a second interaction with said means for interacting takes place.

19. An apparatus according to claim 18, wherein the means for converting are arranged to change the polarization state of the light wave from TE polarization to TM polarization.

* * * * *